United States Patent
Christianson et al.

(10) Patent No.: US 9,547,082 B2
(45) Date of Patent: Jan. 17, 2017

(54) WEATHER RADAR WITH BRIGHT BAND SUPPRESSION

(71) Applicant: Honeywell International Inc., Morristown, NJ (US)

(72) Inventors: Paul E. Christianson, Seattle, WA (US); Brian P. Bunch, Snohomish, WA (US)

(73) Assignee: Honeywell International Inc., Morris Plains, NJ (US)

( * ) Notice: Subject to any disclaimer, the term of this patent is extended or adjusted under 35 U.S.C. 154(b) by 23 days.

(21) Appl. No.: 14/534,926

(22) Filed: Nov. 6, 2014

(65) Prior Publication Data
US 2016/0131758 A1    May 12, 2016

(51) Int. Cl.
*G01S 13/95* (2006.01)
*G01S 7/06* (2006.01)
(Continued)

(52) U.S. Cl.
CPC ............. *G01S 13/95* (2013.01); *G01S 7/062* (2013.01); *G01S 7/411* (2013.01); *G01S 13/953* (2013.01); *G01S 7/14* (2013.01); *G01S 7/22* (2013.01)

(58) Field of Classification Search
CPC ...... G01S 13/95; G01S 13/951; G01S 13/953; G01S 13/955; G01S 13/956; G01S 13/958; G01W 2001/003
(Continued)

(56) References Cited

U.S. PATENT DOCUMENTS

| 5,440,483 A | * | 8/1995 | Badoche-Jacquet .... G01W 1/14 |
| | | | 702/3 |
| 6,741,203 B1 | | 5/2004 | Woodell |

(Continued)

FOREIGN PATENT DOCUMENTS

| EP | 2461177 A1 * | 6/2012 | ............... G01S 7/04 |
| WO | WO 2015037375 A1 * | 3/2015 | ............. B64D 45/04 |

OTHER PUBLICATIONS

"Radar and the Doppler Effect—It's All About Reflectivity!" University Corporation for Atmospheric Research (UCAR), Dec. 31, 2010, 18 pp.
(Continued)

*Primary Examiner* — John B Sotomayor
(74) *Attorney, Agent, or Firm* — Shumaker & Sieffert, P.A.

(57) ABSTRACT

This disclosure is directed to methods, devices, and systems for generating a weather radar output with bright band suppression. In one example, a method includes determining, for each of several portions of a vertical column from a weather radar signal, a reflectivity range selected from a highest reflectivity range and one or more lower reflectivity ranges. The method further includes determining, in response to determining that portions of the vertical column are in the highest reflectivity range, whether a combination of the reflectivity ranges of the portions of the vertical column meet criteria indicative of high-reflectivity stratiform weather. The method further includes generating, in response to determining that the combination of the reflectivity ranges of the portions of the vertical column meet the criteria indicative of high-reflectivity stratiform weather, a weather radar output that indicates each of the portions of the vertical column as associated with one of the lower reflectivity ranges.

19 Claims, 7 Drawing Sheets

(51) Int. Cl.
  *G01S 7/41* (2006.01)
  *G01S 7/14* (2006.01)
  *G01S 7/22* (2006.01)

(58) Field of Classification Search
  USPC .................................. 342/26 R, 26 A–26 D
  See application file for complete search history.

(56) References Cited

U.S. PATENT DOCUMENTS

| | | | |
|---|---|---|---|
| 7,109,912 B1* | 9/2006 | Paramore | G01S 13/953 |
| | | | 342/176 |
| 7,109,913 B1 | 9/2006 | Paramore et al. | |
| 7,205,928 B1 | 4/2007 | Sweet | |
| 7,492,304 B1 | 2/2009 | Woodell et al. | |
| 7,515,088 B1 | 4/2009 | Woodell et al. | |
| 7,541,971 B1 | 6/2009 | Woodell et al. | |
| 7,639,172 B2 | 12/2009 | Chabah et al. | |
| 7,945,071 B2* | 5/2011 | Harrington | G01S 7/295 |
| | | | 342/26 B |
| 8,068,050 B2 | 11/2011 | Christianson | |
| 8,098,188 B2 | 1/2012 | Costes et al. | |
| 8,159,369 B1* | 4/2012 | Koenigs | G01S 7/062 |
| | | | 340/963 |
| 8,212,712 B2 | 7/2012 | Bon et al. | |
| 8,902,100 B1* | 12/2014 | Woodell | G01S 13/95 |
| | | | 324/74 |
| 9,244,166 B1* | 1/2016 | Finley | G01S 13/953 |
| 9,395,438 B1* | 7/2016 | Woodell | G01S 7/04 |
| 9,411,044 B1* | 8/2016 | Sperling | G01S 7/22 |
| 2010/0245165 A1 | 9/2010 | Kauffman et al. | |
| 2012/0133551 A1 | 5/2012 | Pujol et al. | |
| 2012/0139978 A1 | 6/2012 | Bunch et al. | |
| 2012/0212367 A1 | 8/2012 | Rowen et al. | |
| 2013/0328715 A1* | 12/2013 | Jinkins | G01W 1/00 |
| | | | 342/26 B |
| 2015/0145717 A1* | 5/2015 | Lim | G01S 7/025 |
| | | | 342/26 R |

OTHER PUBLICATIONS

Preston, A. et al., "Investigating the Use of Dual-Polarimetric Radar Data As Forecast Guidance for Lightning Cessation at Kennedy Space Center," Thesis submitted to the Florida State University, Nov. 12, 2012, 95 pp.

Zhang, J. et al., "A Real-Time Algorithm for the Correction of Brightband Effects in Radar-Derived QPE," Journal of Hydrometerology, vol. 11, Oct. 2010, pp. 1157-1171.

Extended Search Report from counterpart European Application No. 15192853.8, dated Feb. 22, 2016, 7 pp.

Response to Examination Report dated May 17, 2016, from counterpart European Application No. 15192853.8, filed Nov. 10, 2016, 18 pp.

* cited by examiner

LEGEND 350

B: BLACK / < 20 dBZ
G: GREEN / 20–30 dBZ
Y: YELLOW / 30-40 dBZ
R: RED / > 40 dBZ

WEATHER RADAR WITH BRIGHT BAND SUPPRESSION

This disclosure relates to weather radar systems.

BACKGROUND

An aircraft may use an onboard weather radar system to detect adverse weather conditions, which may enable the flight crew to make changes to the flight plan as necessary to avoid potentially hazardous weather. An aircraft in flight may also receive weather information from ground stations. Up-to-date weather information may assist the flight crew in evaluating whether or how to modify a flight plan to ensure safety of the flight. Airborne weather radar detects reflectivity of weather associated with precipitation. Reflectivity is an electrical quantity related to the percentage of power (normalized for range) returned from the weather being illuminated. Reflectivity is generally related to rate of precipitation.

SUMMARY

This disclosure is directed to systems, devices, and methods for enabling or operating a weather radar processing system that may provide a weather radar output with bright band suppression, and suppression of spurious hazard indications for other high-reflectivity stratiform weather structures. Bright band is a weather radar phenomenon in which the nominal relationship between reflectivity and rate of precipitation breaks down, and a traditional weather radar may show a greater rate of precipitation than is actually present. In particular, when weather conditions cause a stratiform precipitation structure to intersect a freezing point altitude, precipitation that begins as snow falling from above the freezing point altitude falls through the freezing point altitude and begins melting from the exterior inward, such that each snowflake temporarily has a large frozen core but an outer shell of newly molten water, forming a partially melted hydrometeor. Snowflakes are typically much larger and much less reflective than raindrops, but partially melted hydrometeors combine the large size of snowflakes with the high reflectivity of rain, such that they may deceptively appear to weather radars as an exaggerated precipitation rate, also known as bright band. A weather radar processing system with bright band suppression of this disclosure may analyze bright band sources within the context of vertical columns of precipitation, and detect and negate the falsely inflated precipitation rates caused by bright band. By avoiding falsely exaggerated indications of high precipitation rates, a bright band suppressing weather radar processing system of this disclosure may help pilots and flight crews avoid unnecessary detours in flight, thereby promoting fuel efficiency, flight safety, and faster flights.

In one example, a method includes determining, for each of a plurality of portions of a vertical column from a weather radar signal, a reflectivity range selected from a highest reflectivity range and one or more lower reflectivity ranges. The method further includes determining, in response to determining that any of the portions of the vertical column are in the highest reflectivity range, whether a combination of the determined reflectivity ranges of the portions of the vertical column meet one or more criteria indicative of high-reflectivity stratiform weather. The method further includes generating, in response to determining that the combination of the determined reflectivity ranges of the portions of the vertical column meet the one or more criteria indicative of high-reflectivity stratiform weather, a weather radar output that indicates each of the portions of the vertical column as associated with one of the one or more lower reflectivity ranges.

Another example is directed to a device comprising a computer-readable medium having program code stored thereon, the device configured for the program code to be executable by one or more processors for causing the one or more processors to determine, for each of a plurality of portions of a vertical column from a weather radar signal, a reflectivity range selected from a highest reflectivity range and one or more lower reflectivity ranges. The program code is configured for causing the one or more processors to determine, in response to determining that any of the portions of the vertical column are in the highest reflectivity range, whether a combination of the determined reflectivity ranges of the portions of the vertical column meet one or more criteria indicative of high-reflectivity stratiform weather. The program code is further configured for causing the one or more processors to generate, in response to determining that the combination of the determined reflectivity ranges of the portions of the vertical column meet the one or more criteria indicative of high-reflectivity stratiform weather, a weather radar output that indicates each of the portions of the vertical column as associated with one of the one or more lower reflectivity ranges.

Another example is directed to a weather radar system. The system is configured to determine, for each of a plurality of portions of a vertical column from a weather radar signal, a reflectivity range selected from a highest reflectivity range and one or more lower reflectivity ranges. The system is further configured to determine, in response to determining that any of the portions of the vertical column are in the highest reflectivity range, whether a combination of the determined reflectivity ranges of the portions of the vertical column meet one or more criteria indicative of high-reflectivity stratiform weather. The system is further configured to generate, in response to determining that the combination of the determined reflectivity ranges of the portions of the vertical column meet the one or more criteria indicative of high-reflectivity stratiform weather, a weather radar output that indicates each of the portions of the vertical column as associated with one of the one or more lower reflectivity ranges.

The details of one or more examples are set forth in the accompanying drawings and the description below. Other features, objects, and advantages will be apparent from the description and drawings, and from the claims.

DETAILED DESCRIPTION

This disclosure is directed to systems, devices, and methods for enabling or operating a weather radar processing system that may provide a weather radar output with bright band suppression, and suppression of spurious hazard indications for other high-reflectivity stratiform weather structures. Bright band is a weather radar phenomenon in which the nominal relationship between reflectivity and rate of precipitation breaks down, and a traditional weather radar may show a greater rate of precipitation than is actually present. In particular, when weather conditions cause a stratiform precipitation structure to intersect a freezing point altitude, precipitation that begins as snow falling from above the freezing point altitude falls through the freezing point altitude and begins melting from the exterior inward, such that each snowflake temporarily has a large frozen core but an outer shell of newly molten water, forming a partially melted hydrometeor. Snowflakes are typically much larger and much less reflective than raindrops, but partially melted hydrometeors combine the large size of snowflakes with the high reflectivity of rain, such that they may deceptively appear to weather radars as an exaggerated precipitation rate, also known as bright band. A weather radar processing system with bright band suppression of this disclosure may analyze bright band sources or other high-reflectivity sources within the context of vertical columns of precipitation, and detect and negate the falsely inflated precipitation rates caused by bright band or other high-reflectivity stratiform weather structures. Throughout this description, suppression of bright band may be generalized to suppression of spurious indications of hazardous weather by anomalously high-reflectivity stratiform weather structures, as further described below. By avoiding falsely exaggerated indications of high precipitation rates, a bright band suppressing weather radar processing system of this disclosure may help pilots and flight crews avoid unnecessary detours in flight, thereby promoting fuel efficiency, flight safety, and faster flights.

Figure 1:
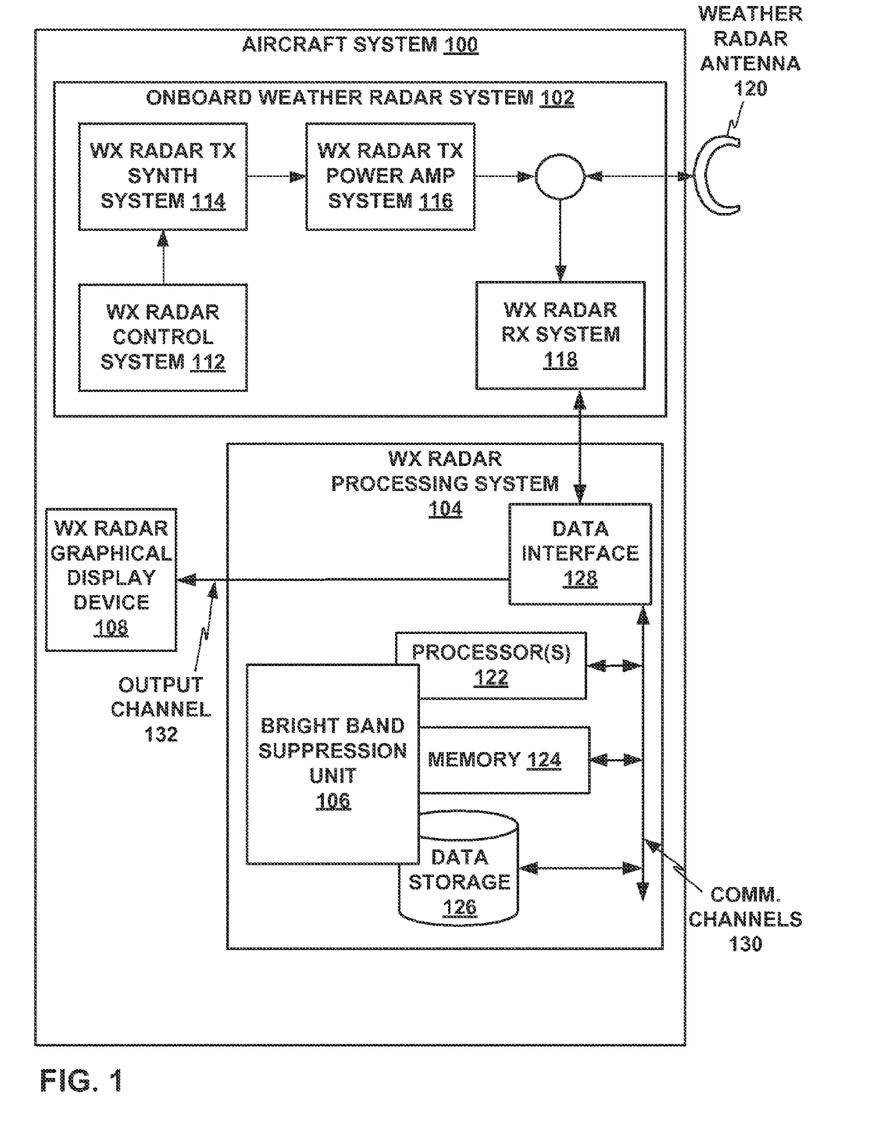
FIG. 1 depicts a conceptual block diagram of an example aircraft system that includes a weather radar processing system with bright band suppression.

FIG. 1 depicts a conceptual block diagram of an example aircraft system 100 that includes a weather radar processing system 104 with bright band suppression. Example aircraft system 100 includes an onboard weather radar system 102, weather radar processing system 104 including a bright band suppression unit 106, and a weather radar graphical display device 108. Weather radar processing system 104 with bright band suppression unit 106 may evaluate weather radar data from onboard weather radar system 102 to determine whether the weather radar signal includes bright band, or includes data that indicates the presence of bright band. If bright band suppression unit 106 determines that the weather radar signal does include bright band, bright band suppression unit 106 may suppress the bright band and may generate a weather radar output with the bright band suppressed, as further described below.

Onboard weather radar system 102 includes a weather radar control system 112, a weather radar transmission synthesis system 114, a weather radar transmission power amplification system 116, and a weather radar receiving system 118, and is connected to a weather radar antenna 120. Weather radar processing system 104 includes one or more processor(s) 122, one or more memory devices 124, one or more data storage devices 126, and a data interface 128. Weather radar display processing system 104 also includes communication channels 130 and output channel 132, such that communication channels 130 are configured to convey data among one or more processors 122, one or more memory devices 124, one or more data storage devices 126, and data interface 128; and output channel 132 is configured to communicate outputs from weather radar processing system 104, such as to weather radar graphical display device 108.

Onboard weather radar system 102 is operatively connected to weather radar processing system 104, such as through a data channel between weather radar receiving system 118 of weather radar system 102 and data interface 128 of weather radar processing system 104. Weather radar processing system 104 is operatively connected to weather radar graphical display device 108, such as through output channel 132, such that weather radar processing system 104 may generate processed weather radar outputs and communicate the processed weather radar outputs to weather radar graphical display device 108.

Bright band suppression unit 106 may be implemented in the form of executable instruction program code and/or data stored or encoded in one or more memory devices 124 and/or one or more data storage devices 126 and that may be executed by one or more processors 122. Bright band suppression unit 106 may be implemented at least in part as, or include, any combination of hardware or hardware and software. Bright band suppression unit 106 may analogously perform suppression of spurious hazard indications for other forms of high-reflectivity stratiform weather. Bright band suppression unit 106 may be implemented at least in part as, or include, one or more executable applications, application modules, libraries, classes, methods, objects, routines, sub-routines, firmware, and/or embedded code, for example. Examples of techniques and methods performed by bright band suppression unit 106 are described further below with additional reference to the subsequent figures.

As noted above, airborne weather radar systems detect reflectivity of weather associated with precipitation. Reflectivity is an electrical quantity related to the percentage of power, normalized for range, returned from the weather being illuminated with the radar. Reflectivity is generally related to rate of rainfall or rate of precipitation, though this relation may be thrown off by partially melted hydrometeors when snow falls through a freezing/melting altitude, as described above, and as illustrated in FIG. 2 and described in further detail in reference thereto.

Figure 2:
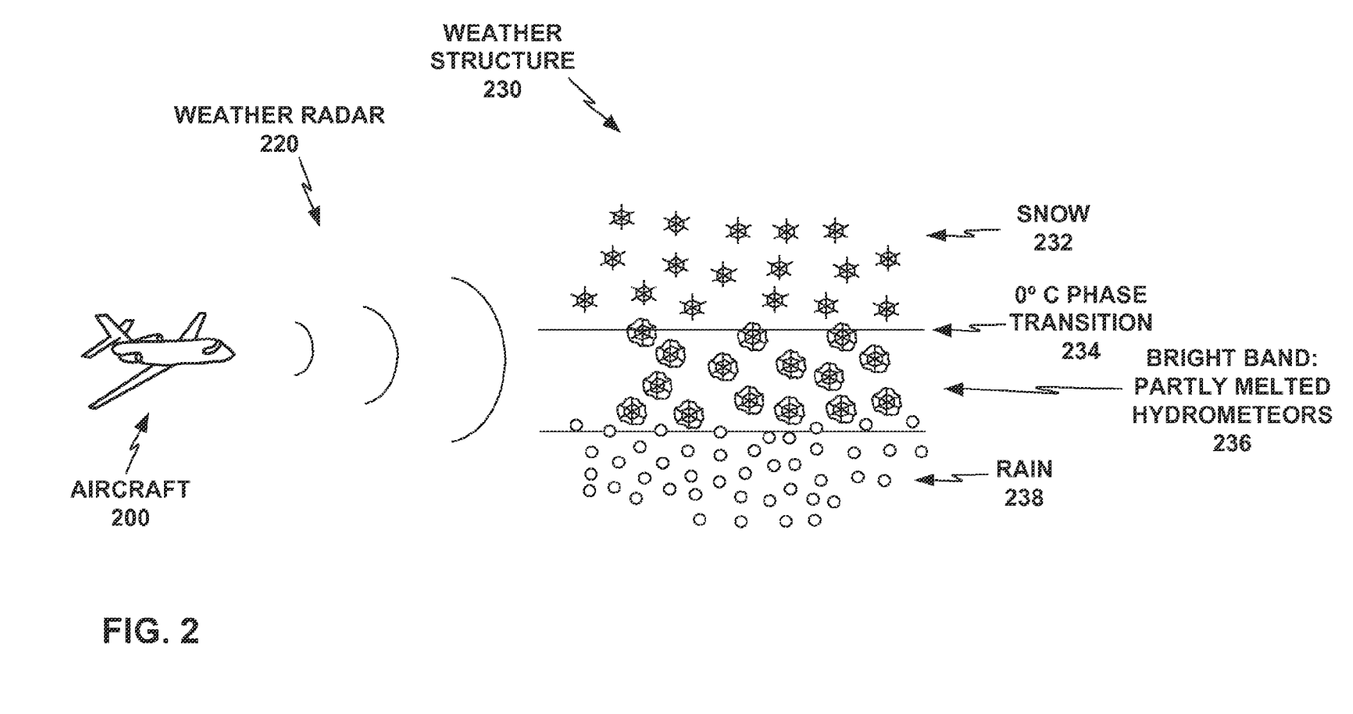
FIG. 2 shows an aircraft emitting a weather radar signal and approaching a stratiform weather structure with a phase transition layer associated with causing a bright band effect of localized exaggerated reflectivity in a received weather radar signal.

FIG. 2 shows an aircraft 200 approaching a weather structure 230 and emitting a weather radar signal 220. Weather structure 230 includes a snow layer 232 at a high altitude; a phase transition altitude 234, at which ambient temperature and pressure conditions change from frozen conditions above to liquid water conditions below; partially melted hydrometeor layer 236 (also referred to as bright band layer 236) at a lower altitude, where the falling snow has begun melting generally from the outside in, and may generally be characterized by low density frozen snowflake structure in the interior and diffusely melted water around the exterior; and a rain layer 238 at a still lower altitude, where the partially melted hydrometeors have fully melted into rain. The partially melted hydrometeor layer 236 is likely to cause a bright band phenomenon in the received signal from weather radar signal 220. The bright band readings from partially melted hydrometeor layer 236 are likely to induce an exaggerated reflectivity relative to the nominal relationship between rate of precipitation and reflectivity, as described above.

The nominal relationship between rate of precipitation and reflectivity may be quantified in terms of, and measured in, decibels (dB) relative to reflectivity (Z), or dBZ. This nominal relationship may also be graphically rendered with different colors representing each of a number of reflectivity ranges. In one typical graphical representation scheme, the lowest range of reflectivity, representing the lowest range of rate of precipitation (including none) may be graphically rendered in black; and increasing levels of reflectivity, representing increasing ranges of rate of precipitation or rate of rainfall, may be graphically represented with green, yellow, and red, respectively. This nominal dBZ relationship is summarized below in Table 1.

TABLE 1

Color Levels vs. dBZ and Rainfall Rate

| DISPLAYED COLOR LEVEL | dBZ Level | Rainfall Rate (mm/hour) |
| --- | --- | --- |
| Black | <20 dBZ | <0.6 |
| Green | 20-30 dBZ | 0.6-2.7 |
| Yellow | 30-40 dBZ | 2.7-11.5 |
| Red | >40 dBZ | >11.5 |

The bright band phenomenon may generally occur in stratiform precipitation, such as in weather structure 230, when part of the weather structure is at or above the phase transition altitude 234 such that the weather structure contains snow at the higher altitudes, in snow layer 232. Frozen water is typically much less reflective than liquid water (approximately 7 dB given identical shapes and sizes). As the snow falls into the warmer air below phase transition altitude 234 and begins to melt, causing a temporary state with an outer layer of liquid water forming over a low-density frozen core on the hydrometeor, the reflectivity of each hydrometer rises substantially. Since the volume of frozen forms of hydrometeors is typically higher than the liquid form, the liquid water surface area of the not-quite-completely melted hydrometeor is large compared to its eventual fully melted surface area. Because reflectivity is strongly a function of hydrometeor diameter, this increased size in combination with the high reflectivity of the liquid water causes an exaggeration of the reflectivity, and apparent precipitation rate with respect to the nominal reflectivity-precipitation rate relationship.

The reflectivity within the bright band layer 236 is still further exaggerated by another factor: liquid drops have a higher terminal velocity than ice particles, and thus begin falling much faster as they finish melting and fall out of bright band layer 236. The faster fall-out of liquid drops below bright band layer 236 leads to a lower number density of hydrometeors in rain layer 238 than in bright band layer 236 and thus cause a further exaggeration in reflectivity of bright band layer 236 relative to rain layer 238. As a result, bright band layer 236 shows a reflectivity substantially higher than rain layer 238 or snow layer 232. Bright band layer 236 thus indicates a substantially higher precipitation rate in the nominal dBZ relationship than the actual precipitation rate. A typical radar system may generate a radar display that outputs a weather radar display that directly represents the received reflectivity in accordance with the nominal dBZ relationship, and thus indicates precipitation rates substantially greater than the actual precipitation rates. In contrast, a weather radar processing system with bright band suppression of this disclosure, such as weather radar processing system 104 with bright band suppression unit 106, may determine whether the weather radar signal includes bright band, and if the weather radar signal does include bright band, generate a weather radar output with the bright band suppressed. In other words, weather radar processing system 104 with bright band suppression unit 106 may generate a weather radar output corrected for the effect of bright band and, as a result, may more accurately indicate the precipitation rates despite the exaggerated reflectivity of the bright band layer 236.

One of the main concerns of an airborne weather radar operator is avoidance of convective weather cells, typically associated with thunderstorms, turbulence, hail, and lightning, all of which are hazards to be avoided. On the other hand, stratiform rainfall usually does not pose hazards beyond loss of visibility. Given that stratiform weather developments can be widespread, it is not operationally realistic to avoid all rainfall. As a result, an aircraft operator seeks to discriminate between stratiform and convective weather to avoid convective hazards, while also avoiding unnecessary deviations around weather. The aircraft operator may typically use several cues to make this distinction including: assessment of the height of a weather structure, either visually or by onboard weather radar; analysis of weather radar display, including contour shape, size and color level of displayed reflectivity; information from external sources (forecasts, air traffic control (ATC), pilot reports (PIREPs)); and general knowledge of weather conditions.

In a weather radar display that represents rainfall rate in accordance with Table 1, the red level display indication often correlates with likely hazardous convective weather conditions. Aircraft operators tend to use this weather radar information in combination with other information as listed above to make tactical navigation decisions. Generally, if the weather radar display shows rainfall rate at the red level and if other information is ambiguous, an aircraft operator may tend to interpret the weather system as convective rather than stratiform, and accordingly change course to travel around the weather structure. In cases with a traditional weather radar system in which the red level display is due to bright band effect, such course change would be unnecessary and would lead to needless lengthening of the trip and increase in fuel usage; such drawbacks may be avoided with use of a weather radar processing system 104 with bright band suppression unit 106 of this disclosure.

In some examples, the relations set forth in Table 1 may not be applicable, or for various other reasons a weather radar system may be calibrated for a different set of weather conditions. For example, in some very high rainfall climates, it may be possible for stratiform rainfall by itself to exceed 40 dBZ in reflectivity. For aircraft operating in such conditions, a weather radar system of this disclosure may be configured to receive additional inputs and/or to make additional determinations to distinguish when a weather radar signal in a highest reflectivity range still meets criteria for a non-hazardous stratiform weather structure, or when a weather structure is stratiform despite having a high reflectivity across a broad or complete span of the vertical columns of the weather radar signal. The additional inputs and/or additional determinations to distinguish when a weather radar signal in a highest reflectivity range still meets criteria for stratiform weather may include receiving external weather information indicating a weather structure to be stratiform, or determining via Global Navigation Satellite System (GNSS) or other position system that the location is climatically likely to have anomalously high rainfall rates in stratiform weather, for example. Table 1 is merely one example of reflectivity ranges including a highest reflectivity range and one or more lower reflectivity ranges that may be used in determining fulfillment of criteria for the occurrence of bright band and for generating outputs that suppress or correct for bright band.

Bright band suppression unit 106 may determine whether bright band is occurring and alter the weather radar output to suppress the bright band effect (e.g., generate a weather radar output with the bright band effect suppressed). Suppressing the bright band in the weather radar output (or generating the weather radar output with the bright band suppressed) may correctly indicate that the weather structure is stratiform rather than convective. Generating the weather radar output with the bright band suppressed may include modifying portions of the weather radar output that have exaggerated reflectivity due to bright band to represent those portions as having less than a selected apparent reflectivity in the output. For example, this may include modifying portions with bright band to represent those portions as having less than or equal to 40 dBZ, such that those portions are not graphically rendered in red in a weather radar graphical display output.

Bright band suppression unit 106 may perform any of several techniques to determine whether portions of a weather radar signal are actually bright band rather than indicating a true rainfall rate above a selected hazardous threshold level. In one example, bright band suppression unit 106 may use a technique that determines a vertically integrated reflectivity (VIR) of a vertical column of a weather structure, in order to determine whether the vertical column is affected by bright band. Determining VIR of a vertical column is further explained with reference to FIGS. 3 and 4.

Figure 3:
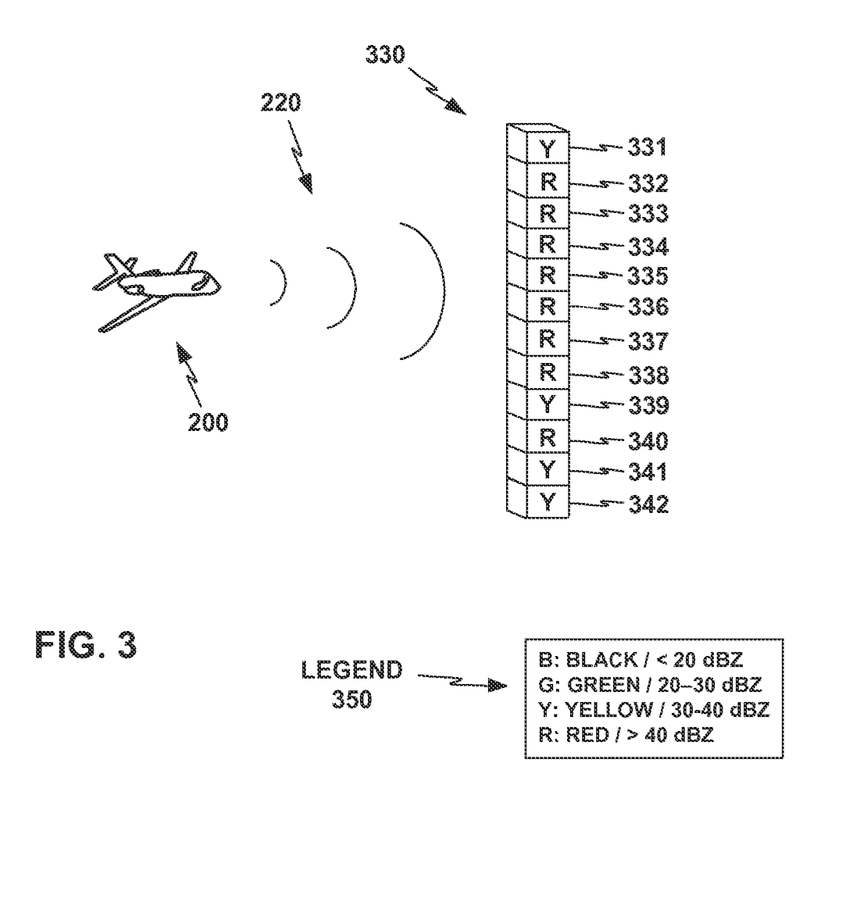
FIG. 3 shows a conceptual diagram of an aircraft emitting a weather radar signal at an example single vertical column of a convective weather structure with a high rainfall rate.
Figure 4:
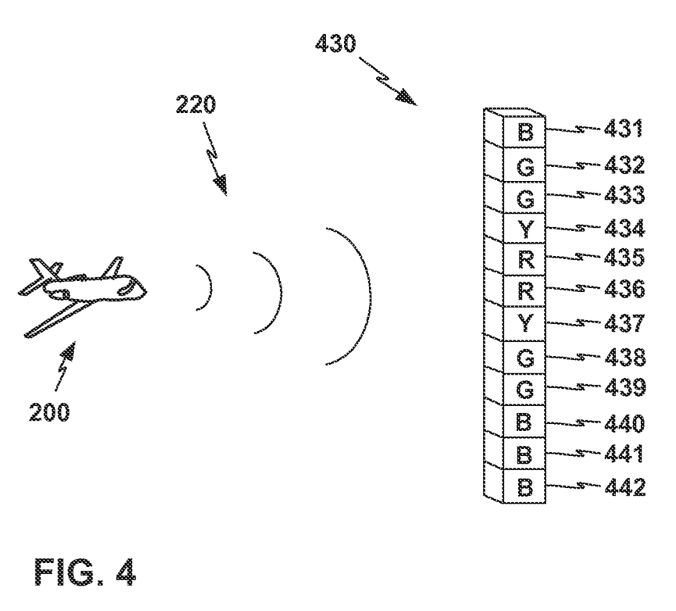
FIG. 4 shows a conceptual diagram of an aircraft emitting a weather radar signal at an example single vertical column of the stratiform weather structure of FIG. 2 associated with bright band effect.

FIGS. 3 and 4 each show a conceptual diagram of aircraft 200 emitting weather radar signal 220 at example single vertical columns 330, 430 respectively of a weather structure above the Earth's surface. Vertical column 330 of FIG. 3 corresponds to a weather structure with an actual high rainfall rate corresponding to hazardous convective cells, while vertical column 430 of FIG. 4 corresponds to weather structure 230 of the example of FIG. 2 with snow falling through a phase transition layer and causing a bright band effect of localized exaggerated reflectivity in a safe, stratiform weather structure that actually has a moderate precipitation rate. In each of the examples of FIGS. 3 and 4, aircraft 200 may use a weather radar processing system with bright band suppression to determine whether the weather structure is affected by bright band, and to generate a weather radar output that may accordingly be conditioned or modified with bright band suppression. For example, the bright band suppressing weather radar processing system of aircraft 200 may determine the VIR of the vertical column 330, 430 respectively in order to determine whether the vertical column is affected by bright band. Throughout the description herein, aircraft 200 may be considered in an example in which aircraft system 100 of FIG. 1 is carried aboard aircraft 200 and is enabled to function aboard aircraft 200, including to transmit weather radar signal 220, receive return weather radar signals from the emission of weather radar signal 220, and process the returned weather radar signals with weather radar processing system 104 including bright band suppression unit 106.

In FIG. 3, weather structure vertical column 330 may be treated as being divided into individual portions 331-342 as shown, which may be three-dimensional "boxes" or slices of space in vertical column 330 that may correspond to portions of vertical column 330 as it is represented in the returned weather radar signal received and analyzed by the weather radar system aboard aircraft 200. Individual portions 331-342 are depicted in different letter codes as shown in FIG. 3 that may correspond, as indicated in legend 350, to the various colors in accordance with Table 1 in a weather radar graphical display, indicative of reflectivity in dBZ as determined from the returned weather radar signal received by aircraft 200. Vertical column 330 is part of a real convective weather structure with actually high rainfall. As such, its individual portions 331-342 are fairly homogeneous, all indicative of moderate or high reflectivity.

The bright band suppressing weather radar processing system 104 of aircraft 200 may determine the reflectivity of each of the individual portions 331-342 of vertical column 330 as shown, and then the bright band suppression unit 106 aboard aircraft 200 may determine the VIR of vertical column 330. In particular, bright band suppression unit 106 may first receive the reflectivity information for portions 431-442. Bright band suppression unit 106 may then check whether any of the portions 431-443 have a reflectivity dBZ in the highest reflectivity range of over 40 dBZ in the reflectivity range divisions applicable in this example. Bright band suppression unit 106 may detect that portions 332, 333, and 335-339 all have reflectivity above 40 dBZ. In response to determining that at least one of the portions of vertical column 330 is in the highest reflectivity range of greater than 40 dBZ, bright band suppression unit 106 may then proceed to determine the VIR of the vertical column 330.

In determining the VIR of a vertical column, bright band suppression unit 106 may sum up the values of reflectivity of each of the portions 331-342 of vertical column 330. For example, weather radar processing system 104 may determine the twelve values of reflectivity for the twelve portions 331-342 of vertical column 330 each to be at different values between 30-40 or 40-50 dBZ, and bright band suppression unit 106 may determine the sum of reflectivities of each of the twelve portions 331-342 of vertical column 330 to total 520 dBZ. Given the high reflectivity of each of the portions 331-342 across a large vertical extent of vertical column 330, bright band suppression unit 106 determines a relatively large VIR for vertical column 330, above a selected threshold VIR stored or determined by bright band suppression unit 106 for corresponding to true high rainfall rate instead of bright band.

Since the VIR of vertical column 330 is determined to be above the threshold VIR in this example, bright band suppression unit 106 determines that vertical column 330 is not affected by bright band. Bright band suppression unit 106 may perform this same process of VIR evaluation for bright band effect on each of several vertical columns of a weather structure as represented in a received weather radar signal across two or three horizontal dimensions, and may continue performing this bright band analysis process on all the available vertical columns at ongoing or regular intervals over time.

The specific selected threshold VIR may vary widely in different examples and in different contexts within a given example. The specific selected threshold VIR may also be scaled relative to the number of vertical portions into which a vertical column in space is divided, in the data binning performed by weather radar processing system 104 and/or in the analysis performed by bright band suppression unit 106. In the example above in which the vertical column is divided into twelve portions, in one example, bright band suppression unit 106 may store or set a threshold VIR of 432 dBZ (e.g., 90% of 40 dBZ times 12 for the twelve portions into which the vertical column is partitioned in this example). In other examples also with the vertical column is divided into twelve portions, bright band suppression unit 106 may store or set a threshold VIR of higher or lower values, such as 480 dBZ or 334 dBZ (e.g., 100% or 80%, respectively, of 40 dBZ times 12 for the twelve portions into which the vertical column is partitioned in this example), or any of a wide range of other values that may be correlated or calibrated to specific conditions in accordance with engineering refinements (e.g., scaled for number of partitions, or calibrated after field testing in comparison with independent methods of characterizing weather structures). Bright band suppression unit 106 may use any of a wide variety of other VIR thresholds in other examples in which it may use other numbers of portions into which it divides or partitions a vertical column. Bright band suppression unit 106 may also apply other techniques and criteria besides VIR to determine whether a vertical column is affected by bright band, as further explained below.

In the example as described above, because bright band suppression unit 106 determines that vertical column 330 is not affected by bright band, bright band suppression unit 106 causes weather radar processing system 104 to generate a weather radar output that is not modified for bright band suppression. Weather radar processing system 104 may communicate this output to weather radar graphical display device 108 which may generate a graphical rendering of the weather radar output with the portions of vertical column 330 shown as mostly red portions and a few yellow portions as indicated in FIG. 3, with reference to legend 350.

FIG. 4 shows a conceptual diagram of aircraft 200 emitting weather radar signal 220 at a single vertical column 430 of weather structure 230 of the example of FIG. 2. As noted above, vertical column 430 of FIG. 4 corresponds to a weather structure with snow falling through a phase transition layer and causing a bright band effect of localized exaggerated reflectivity in a safe, stratiform weather structure that actually has a moderate precipitation rate. In the example of FIG. 4 as well, bright band suppression unit 106 may determine the VIR of the vertical column 430 in order to determine whether the vertical column is affected by bright band.

In FIG. 4, weather structure vertical column 430 may also be treated as being divided into individual portions 431-442 as shown, as three-dimensional boxes or slices of space in vertical column 430 that may correspond to portions of vertical column 430 as it is represented in the returned weather radar signal received and analyzed by the weather radar system aboard aircraft 200. Individual portions 431-442 are also depicted in letter codes that may correspond in accordance with legend 350 to the various colors in accordance with Table 1 in a weather radar graphical display, indicative of reflectivity in dBZ as determined from the returned weather radar signal received by aircraft 200. As opposed to the example of FIG. 3, vertical column 430 in FIG. 4 is part of a stratiform weather structure affected by bright band. As such, its individual portions 331-342 vary widely, with upper portions of moderate snowfall with low to moderate reflectivity, lower portions of moderate rainfall with low to moderate reflectivity, and a narrow intermediate section of bright band with high reflectivity due to melting snow, as described above.

As in the example above, weather radar processing system 104 with bright band suppression unit 106 of aircraft 200 may determine the reflectivity of each of the individual portions 431-442 of vertical column 430 as shown. Bright band suppression unit 106 may then receive the reflectivity information for portions 431-442. Bright band suppression unit 106 may first check whether any of the portions 431-443 have a reflectivity dBZ in the highest reflectivity range of over 40 dBZ in the reflectivity range divisions applicable in this example. Bright band suppression unit 106 may detect that portions 435 and 436 do indeed have reflectivity of 45 dBZ. In response to determining that at least one of the portions of vertical column 430 is in the highest reflectivity range of greater than 40 dBZ, bright band suppression unit 106 may then proceed to determine the VIR of the vertical column 430.

Bright band suppression unit 106 may determine the VIR of vertical column 430 by summing up the values of reflectivity of each of the portions 431-442. In this example, weather radar processing system 104 may determine specific values of reflectivity for the twelve portions 431-442 of vertical column 430 which may fall in the following reflectivity ranges: portions 431, 440, 441, and 442 at less than 20 dBZ; portions 432, 433, 438, and 439 at 20-30 dBZ; portions 434 and 437 at 30-40 dBZ; and portions 435 and 436 at greater than 40 dBZ. Bright band suppression unit 106 may determine the sum of reflectivities of each of the twelve portions 431-442 of vertical column 430 to total 300 dBZ. Bright band suppression unit 106 may determine that this VIR of 300 dBZ is less than the threshold VIR of 380 dBZ applicable in this example.

Bright band suppression unit 106 may also perform analogous analyses on multiple vertical columns of the same weather structure, and in some examples may perform this analysis on vertical columns covering the entire received radar signal covering the weather structure. Bright band suppression unit 106 may determine that the VIR of each vertical column in the weather structure is less than the threshold VIR. In response to determining that the VIR of each vertical column it processes is less than the threshold VIR, bright band suppression unit 106 may cause weather radar processing system 104 to generate an output with the bright band effect suppressed. That is, bright band suppression unit 106 may cause weather radar processing system 104 to generate an output indicative of the weather structure having lower precipitation rate than would be indicated with an unsuppressed bright band output.

In other words, in some examples, bright band suppression unit 106 may determine a reflectivity range selected from a highest reflectivity range (e.g., over 40 dBZ) and one or more lower reflectivity ranges (e.g., the lower dBZ ranges in Table 1), for each of a plurality of portions of multiple vertical columns from the received weather radar signal, including a first vertical column and one or more additional vertical columns. In response to determining that any of the portions of each respective vertical column are in the highest reflectivity range, bright band suppression unit 106 may then determine, for each respective vertical column, whether a combination of the determined reflectivity ranges of the portions of the respective vertical column meet one or more criteria indicative of bright band, e.g., a VIR under the VIR threshold. If bright band suppression unit 106 determines that the combination of the determined reflectivity ranges of the portions of the vertical column meet the one or more criteria indicative of bright band for each one of the vertical columns, e.g., that the VIR is under the VIR threshold for each of the vertical columns, then bright band suppression unit 106 may generate a weather radar output with bright band suppression, that indicates each of the portions of all of the vertical columns as associated with one of the one or more lower reflectivity ranges (e.g., with the red portions modified to be depicted in yellow per the representation scheme of Table 1).

Thus, in this example, if bright band suppression unit 106 determines that the high reflectivity in any one of the several vertical columns does not meet the one or more criteria for bright band, bright band suppression unit 106 determines not to perform bright band suppression, and permits weather radar processing system 104 to generate the typical output that directly represents or depicts the high reflectivity portions. Thus, in this example, even if most vertical columns of a received weather radar signal would otherwise meet the criteria for bright band but at least one column does not, bright band suppression unit 106 refrains from performing bright band suppression. This is one example in which bright band suppression unit 106 may be calibrated to err on the side of caution in modifying weather radar signals, to ensure that it does not inaccurately depict a weather structure as being less likely to be hazardous than it actually is. In other examples, as may be calibrated in accordance with engineering refinement practices, if bright band suppression unit 106 determines that all vertical columns of a received weather radar signal are consistent with bright band other than one or two close exceptions, bright band suppression unit 106 may perform a double-check or analyze for potential error in the weather radar signal or in its own processing, and may still proceed to perform bright band suppression on the weather radar output of weather radar processing system 104 if bright band suppression unit 106 determines that the only exception to indication of bright band was an isolated error.

In other examples, as further described below, bright band suppression unit 106 may apply other techniques and criteria besides performing VIR and comparing with a threshold VIR to determine whether to perform a bright band suppression and to cause weather radar processing system 104 to generate a bright band suppressed output. This bright band suppressed output from weather radar processing system 104 may indicate or depict the weather structure as being free of portions having the highest reflectivity range and associated with hazardous precipitation rate. This bright band suppressed output is further described below with reference to FIGS. 5 and 6.

Figure 5:
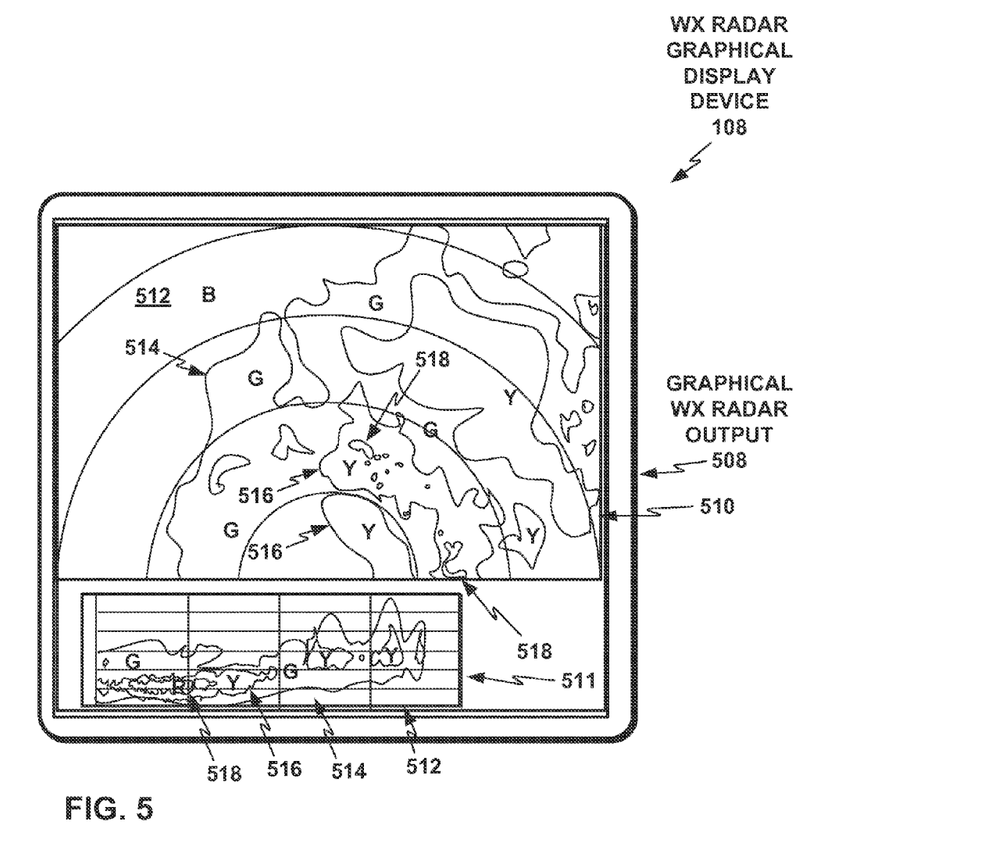
FIG. 5 shows a graphical weather radar display device of the aircraft system of FIG. 1 and aircraft of FIG. 2 rendering a graphical weather radar output of the bright band affected weather structure of FIGS. 2 and 4 without bright band suppression.

FIG. 5 shows a weather radar graphical display device 108 of aircraft system 100 and aircraft 200 rendering a graphical weather radar output 508 of the bright band affected weather structure of FIGS. 2 and 4 without bright band suppression. Graphical weather radar output 508 corresponds to the example described above with reference to FIG. 4 except as generated by a traditional weather radar system without bright band suppression, or by weather radar processing system 104 if bright band suppression unit 106 were deactivated. Graphical weather radar output 508 is rendered in a horizontal graphical weather radar display 510 and a vertical graphical weather radar display 511. Graphical weather radar output 508 renders or depicts the portions of highest reflectivity range 518 in red, in accordance with the representation scheme shown in Table 1 above, although those portions of highest reflectivity range are due to bright band. Graphical weather radar output 508 also renders or depicts the portions of lowest reflectivity range 512 in black, the portions of moderately low reflectivity range 514 in green, and the portions of moderately high reflectivity range 516 in yellow, in accordance with the representation scheme shown in Table 1 above.

Graphical weather radar output 508 in a traditional weather radar system without bright band suppression may be likely to convince a pilot or flight crew of aircraft 200 to alter course to steer clear of the weather structure depicted in graphical weather radar output 508, although this would actually be a waste of time and fuel. The flight crew of aircraft 200 for purposes of this discussion may include personnel who are not necessarily physically present onboard aircraft 200 but who are supporting or controlling the flight of aircraft 200.

Figure 6:
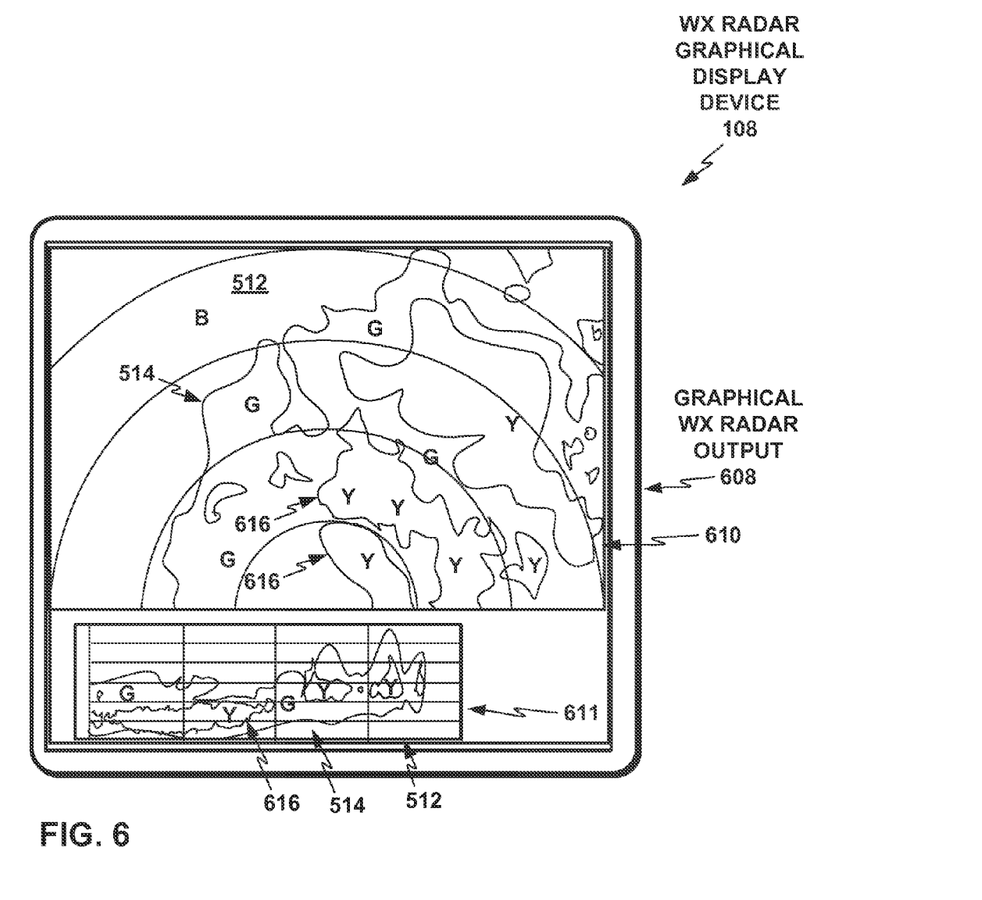
FIG. 6 shows a graphical weather radar display device of the aircraft system of FIG. 1 and aircraft of FIG. 2 rendering a graphical weather radar output of the bright band affected weather structure of FIGS. 2 and 4 with bright band suppression.

FIG. 6 shows a weather radar graphical display device 108 of aircraft system 100 and aircraft 200 rendering a graphical weather radar output 608 of the bright band affected weather structure of FIGS. 2 and 4 with bright band suppression. Graphical weather radar output 608 corresponds to the example described above with reference to FIG. 4 with bright band suppression unit 106 causing weather radar processing system 104 to modify its output to suppress bright band, and to modify the output of the initial weather radar signal to indicate or depict the bright band portions as being in the second-highest reflectivity range rather than in the highest reflectivity range, e.g., to depict those portions in yellow rather than in red, in accordance with the representation scheme of Table 1 as above.

Graphical weather radar output 608 is rendered in a horizontal graphical weather radar display 610 and a vertical graphical weather radar display 611. With the highest reflectivity portions of vertical weather columns modified by bright band suppression unit 106 in the output generated by weather radar processing system 104, graphical weather radar output 608 depicts the highest reflectivity range portions modified to be depicted in yellow instead, nominally indicative of the second-highest reflectivity range, and blending in with the already yellow portions of moderately high reflectivity range 616 with no perceptible distinction, such that the graphical weather radar output is free of red portions indicative of the highest reflectivity range. Graphical weather radar output 608 of FIG. 6 thus outputs moderately high reflectivity range 616 in yellow throughout the areas that graphical weather radar output 508 of FIG. 5 outputs in both yellow and red, for moderately high reflectivity range 516 and highest reflectivity range 518 put together. Graphical weather radar output 608 also renders or depicts the portions of lowest reflectivity range 512 in black and the portions of moderately low reflectivity range 514 in green, as in graphical weather radar output 508 of FIG. 5, in accordance with the representation scheme shown in Table 1 above. Other color schemes may also be used, though in many examples the color red may be reserved to represent the highest reflectivity range, given the innate special status of the color red across human cultures (such as association with danger and/or alertness), while the second-highest reflectivity range and any additional reflectivity ranges are each depicted in a non-red color.

Graphical weather radar output 608 with bright band suppression may be likely to help a pilot or flight crew of aircraft 200 to understand the actual nature of the weather structure as being free of the high precipitation rate typically correlated with convective cells and its associated hazards such as lightning and turbulence. As such, graphical weather radar output 608 as enabled by bright band suppression unit 106 and as bright band suppression unit 106 causes weather radar processing system 104 to generate may enable the pilot or flight crew to maintain heading, keeping the flight on schedule and making efficient use of its fuel.

Although the threshold corresponding to the highest reflectivity range (and, e.g., graphically depicted in red) may normally be 40 dBZ, the threshold may be modified in other examples, such as in the case of manual gain. In some examples, weather radar processing system 104 and/or bright band suppression unit 106 may automatically account for or recalibrate for changes in scale or signal sensitivity such as in the case of manual gain. For example, in case of manual gain, weather radar processing system 104 may apply a scale translation uniformly to all the reflectivity ranges (e.g., as in Table 1), to ensure that the same graphical indications are applied uniformly to the same real reflectivity ranges as manual gain is adjusted, and such that bright band suppression unit 106 still modifies bright band signals to cause weather radar processing system 104 to generate outputs that indicate or depict bright band weather structure portions in an intermediate reflectivity range (e.g., second highest reflectivity range) instead of in the highest reflectivity range.

In some examples, aircraft 200 may be an unpiloted aircraft (e.g., an uncrewed aerial vehicle (UAV)) or an aircraft on autopilot or otherwise being flown entirely or in part by software, and the automatic flight software may be enabled to make tactical navigation decisions. In these examples, bright band suppression unit 106 may cause weather radar processing system 104 to generate weather radar outputs to the automatic flight software directly as data to feed to a navigation decision module, instead of as data for a weather radar graphical display device to render in a graphical display. In these examples, bright band suppression unit 106 may analogously cause weather radar processing system 104 to generate weather radar outputs in which bright band portions of weather structures are indicated as being within an intermediate reflectivity range instead of being in the highest reflectivity range as would be indicated from the initial data without applying bright band suppression. Bright band suppression unit 106 may thus enable an automatic software-based navigation and/or piloting system to make decisions based on an accurate characterization of bright band affected weather structures despite the anomalously high reflectivity induced by the bright band effect.

In some examples, bright band suppression unit 106 may apply a variety of other techniques and criteria besides determining VIR and comparing VIR with a threshold VIR to determine whether a radar signal from a weather structure is affected by bright band. In some examples, bright band suppression unit 106 may apply vertical span as a criterion. In these examples, for bright band suppression unit 106 to determine whether the combination of the determined reflectivity ranges of the portions of the vertical column meet the criteria indicative of bright band includes bright band suppression unit 106 determining whether a vertical span of the portions of the vertical column that are in the highest reflectivity range is less than a threshold vertical span. For example, bright band suppression unit 106 may determine the vertical span or vertical distance between the center or top of the topmost portion in the vertical column having the highest reflectivity and the center or bottom of the lowest portion in the vertical column having that has the highest reflectivity.

If bright band suppression unit 106 determines that the vertical span is low or covers a short vertical distance such that it is below a threshold vertical span, bright band suppression unit 106 determines that the determined reflectivity ranges of the portions of the vertical column meet the criterion indicative of bright band, while if the vertical span is higher than the threshold vertical span, bright band suppression unit 106 determines that the vertical column does not meet the criterion indicative of bright band. The threshold vertical span may be 2,000 feet or 3,000 feet, or another value between 1,000 feet and 5,000 feet, or other value that may be determined by testing in comparison with independent means of characterizing weather structures, in various examples.

In other examples, bright band suppression unit 106 may apply vertical difference in reflectivity range, or dBZ range, as the criterion or one of the criteria for determining whether a vertical column is affected by bright band. In such examples, bright band suppression unit 106 may determine whether a vertical difference in reflectivity range between at least one of the portions of the vertical column that are in the highest reflectivity range and at least of the portions of the vertical column that are in one of the lower reflectivity ranges is greater than a threshold difference. In other words, bright band suppression unit 106 may determine if there is a substantial jump in reflectivity within a relatively short vertical range. In one example, bright band suppression unit 106 may evaluate whether any portion of the vertical column in the highest reflectivity range (e.g., >40 dBZ or red in Table 1) has a portion within an interval of, e.g., three, two, or one portions below it that has substantially lower reflectivity, e.g., at least 10 dBZ below the lower bound of the highest reflectivity range (e.g., the 20-30 dBZ range (green) or lower). In some other examples, bright band suppression unit 106 may apply a vertical difference in reflectivity range of any value between 10 and 40 dBZ for this criterion.

In other examples, bright band suppression unit 106 may combine analysis of two or more criteria such as those described above, and/or including double-checking or error analysis in radar signal and/or processing as described above. For example, bright band suppression unit 106 may apply two or all three of VIR, vertical span, and vertical difference in dBZ range as described above, and may apply any of various options in decision logic in combining the results.

Figure 7:
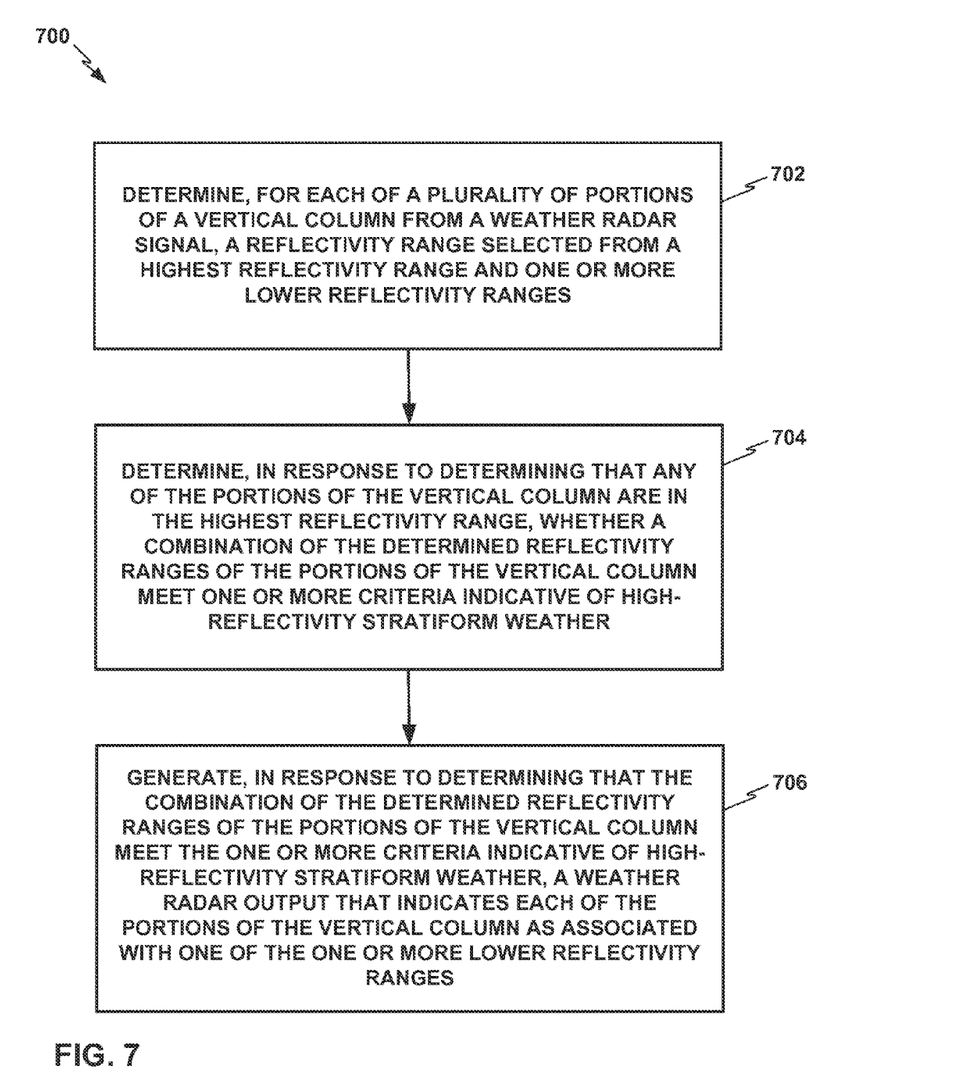
FIG. 7 shows a flowchart for an example method for generating a weather radar output with bright band suppression.

FIG. 7 shows a flowchart for an example method 700 for generating a weather radar output with bright band suppression, in accordance with illustrative aspects of this disclosure. Method 700 includes determining, by one or more processors (e.g., one or more processors 122 of weather radar processing system 104), for each of a plurality of portions of a vertical column (e.g., any two or more portions 431-442 of vertical column 430) from a weather radar signal (e.g., weather radar signal 220 emitted using onboard weather radar system 102 and weather radar antenna 120 of aircraft system 100 of aircraft 200), a reflectivity range selected from a highest reflectivity range (e.g., greater than 40 dBZ, normally rendered in red, as per Table 1) and one or more lower reflectivity ranges (e.g., the lower dBZ ranges shown in Table 1) (702).

Method 700 further includes determining, by the one or more processors (e.g., one or more processors 122 of weather radar processing system 104 executing instructions from program code of bright band suppression unit 106), in response to determining that any of the portions of the vertical column are in the highest reflectivity range, whether a combination of the determined reflectivity ranges of the portions of the vertical column meet one or more criteria indicative of high-reflectivity stratiform weather (e.g., the criteria based on VIR, vertical span, vertical difference in reflectivity range, double-checking, error correction, and/or combinations thereof, as described above) (704). Method 700 further includes generating, by the one or more processors (e.g., one or more processors 122 of weather radar processing system 104 executing instructions from program code of bright band suppression unit 106), in response to determining that the combination of the determined reflectivity ranges of the portions of the vertical column meet the one or more criteria indicative of high-reflectivity stratiform weather, a weather radar output (e.g., graphical weather radar output 608 generated by weather radar processing system 104, communicated via output channel 132 to weather radar graphical display device 108) that indicates each of the portions of the vertical column as associated with one of the one or more lower reflectivity ranges (e.g., as shown in graphical weather radar output 608) (706). Some additional details of some examples are described below.

In some examples, the weather radar data may include, for example, radar reflectivity data in an earth-referenced three-dimensional (or "volumetric") memory buffer (e.g., in one or more memory devices 124 in weather radar processing system 104). The memory buffer may include the radar imaging data combined with sources of three-dimensional geographic and atmospheric data and sources of three-dimensional aircraft data on the aircraft's position, altitude, heading, and speed, for example. One or more processors onboard the aircraft may combine the three-dimensional radar imaging data, the geographic and atmospheric data, and the aircraft data to store in the memory buffer, and/or in other data storage (e.g., data storage 126). A weather radar system, e.g., onboard an aircraft, may be configured to scan the entire three-dimensional space in front of the aircraft, and the one or more processors may store the reflectivity data in the three-dimensional memory buffer. The one or more processors onboard the aircraft may update the memory buffer with newly obtained radar reflectivity data. The one or more processors may extract reflectivity data from the memory buffer to generate the desired weather information, and for bright band suppression unit 106 to apply bright band criteria or other high-reflectivity stratiform weather criteria and to perform bright band suppression, without having to make and wait for view-specific antenna scans. In addition, with the three-dimensional volumetric buffer data, the presentation of weather information is not constrained to a single tilt-plane such as is inherent to conventional radar.

In some examples, weather radar processing system 104 may generate the weather radar output configured for a high-resolution display enabled for display of a three-dimensional (3D) view of the weather structure and the reflectivity range of each of its portions, with or without bright band suppression. This high-resolution display of the weather structure may be enabled for a high resolution in time, such as a high frame rate (e.g., above a selected frame rate). In addition, or instead, this high-resolution display of the weather structure and the reflectivity range of each of its portions, with or without bright band suppression, may also be enabled for a high range (e.g., above a selected distance threshold). The high-resolution display of the weather structure and the reflectivity range of each of its portions as potentially modified by bright band suppression unit 106 may serve as a valuable resource in assisting the crew of the aircraft 200 in understanding the weather structure, and whether or how they should alter their flight strategy or flight plan to avoid the weather structure.

The techniques of this disclosure may be implemented in a device or article of manufacture comprising a computer-readable storage medium. The term "processor," as used herein may refer to any of the foregoing structure or any other structure suitable for processing program code and/or data or otherwise implementing the techniques described herein. While weather radar system 102 and weather radar processing system 104 with bright band suppression unit 106 are separate systems in the example depicted in FIG. 1, in other examples, features or aspects of weather radar processing system 104 with bright band suppression unit 106 may be implemented as parts of a weather radar system as a single integrated unit. In some such examples, bright band suppression unit 106 may be implemented as a feature or function of weather radar receiving system 118 of weather radar system 102, or weather radar receiving system 118 of weather radar system 102 and weather radar processing system 104 with bright band suppression unit 106 may be implemented together as a single system, subsystem, device, or component.

Elements of weather radar processing system 104 and/or bright band suppression unit 106, and/or system elements for executing and/or storing bright band suppression unit 106 or features thereof (e.g., one or more processors 122) as disclosed above, may be implemented in any of a variety of types of solid state circuit elements, such as central processing units (CPUs), digital signal processors (DSPs), application-specific integrated circuits (ASICs), a magnetic non-volatile random-access memory (RAM) or other types of memory, a mixed-signal integrated circuit, a field programmable gate array (FPGA), a microcontroller, a programmable logic controller (PLC), a system on a chip (SoC), a subsection of any of the above, an interconnected or distributed combination of any of the above, or any other integrated or discrete logic circuitry, or any other type of component or one or more components capable of being configured in accordance with any of the examples disclosed herein. One or more memory devices 124 may include any volatile or non-volatile media, such as a RAM, ROM, non-volatile RAM (NVRAM), electrically erasable programmable ROM (EEPROM), flash memory, and the like. One or more memory devices 124 may store computer readable instructions that, when executed by one or more processors 122, cause the one or more processors 122 to implement the techniques attributed to bright band suppression unit 106 herein.

Elements of bright band suppression unit 106 may be programmed with various forms of software. Bright band suppression unit 106 may be implemented at least in part as, or include, one or more executable applications, application modules, libraries, classes, methods, objects, routines, subroutines, firmware, and/or embedded code, for example. Elements of bright band suppression unit 106 as in any of the examples herein may be implemented as a device, a system, an apparatus, and may embody or implement a method of bright band suppression, including for implementing example method 700 as described with reference to FIG. 7.

The techniques of this disclosure may be implemented in a wide variety of computing devices. Any components, modules or units have been described provided to emphasize functional aspects and does not necessarily require realization by different hardware units. The techniques described herein may be implemented in hardware, software, firmware, or any combination thereof. Any features described as modules, units or components may be implemented together in an integrated logic device or separately as discrete but interoperable logic devices. In some cases, various features may be implemented as an integrated circuit device, such as an integrated circuit chip or chipset.

Aircraft system 100 may be implemented on any type of aircraft; analogous weather radar systems with bright band suppression of this disclosure may also be implemented in other contexts such as a ground-based weather station. An "aircraft" as described and claimed herein may include any fixed-wing or rotary-wing aircraft, airship (e.g., dirigible or blimp buoyed by helium or other lighter-than-air gas), suborbital spaceplane, spacecraft, expendable or reusable launch vehicle or launch vehicle stage, or other type of flying device. An "aircraft" as described and claimed herein may include any crewed or uncrewed craft (e.g., uncrewed aerial vehicle (UAV), flying robot, or automated cargo or parcel delivery craft). While the example of FIG. 1 shows weather radar processing system 104 communicating processed weather radar outputs to weather radar graphical display device 108 for graphical display for a pilot or flight crew, in other examples, weather radar processing system 104 may communicate processed weather radar outputs to another system, component, device, software module, computer, or other feature. For example, in an automated navigation system or in an uncrewed aircraft that does not include a graphical radar display, weather radar processing system 104 may communicate processed weather radar outputs to a software module, computer, embedded circuit, or other feature that performs automated navigation.

Various illustrative aspects of the disclosure are described above. These and other aspects are within the scope of the following claims.

What is claimed is:

1. A method comprising:
  determining, by one or more processors, for each of a plurality of portions of a plurality of vertical columns from a weather radar signal, a reflectivity range selected from a highest reflectivity range and one or more lower reflectivity ranges;
  determining, by the one or more processors, for each respective vertical column of the plurality of vertical columns, in response to determining that any of the portions of the respective vertical columns are in the highest reflectivity range, whether a combination of the determined reflectivity ranges of the portions of the vertical column meet one or more criteria indicative of high-reflectivity stratiform weather; and
  generating, by the one or more processors, in response to determining that the combination of the determined reflectivity ranges of the portions of the vertical column meet the one or more criteria indicative of high-reflectivity stratiform weather for each of the vertical columns, a weather radar output that indicates each of the portions of all the vertical columns as associated with one of the one or more lower reflectivity ranges.

2. The method of claim 1, wherein the one or more criteria indicative of high-reflectivity stratiform weather comprise one or more criteria indicative of bright band.

3. The method of claim 1, wherein determining whether the combination of the determined reflectivity ranges of the portions of the plurality of vertical columns meet the one or more criteria indicative of high-reflectivity stratiform weather comprises determining whether a vertically integrated reflectivity (VIR) of at least one of the plurality of vertical columns is below a threshold VIR.

4. The method of claim 3, wherein the threshold VIR is between 90% and 100% inclusive of a sum of 40 decibels relative to reflectivity (dBZ) per number of the portions of the plurality of vertical columns.

5. The method of claim 1, wherein determining whether the combination of the determined reflectivity ranges of the portions of the plurality of vertical columns meet the one or more criteria indicative of high-reflectivity stratiform weather comprises determining whether a vertical span of the portions of at least one of the plurality of vertical columns that are in the highest reflectivity range is less than a threshold vertical span.

6. The method of claim 5, wherein the threshold vertical span is between 1,000 feet and 5,000 feet.

7. The method of claim 1, wherein determining whether the combination of the determined reflectivity ranges of the portions of the plurality of vertical columns meet the one or more criteria indicative of high-reflectivity stratiform weather comprises determining whether a vertical difference in reflectivity range between at least one of the portions of at least one of the plurality of vertical columns that are in the highest reflectivity range and at least one of the at least one of the plurality of portions of the vertical columns that are in one of the lower reflectivity ranges is greater than a threshold difference.

8. The method of claim 7, wherein the threshold vertical difference in reflectivity range is between 10 and 40 dBZ.

9. The method of claim 1, wherein generating the weather radar output that indicates each of the portions of the vertical column as associated with the one or more lower reflectivity ranges comprises indicating each of the portions of the plurality of vertical columns as having less than 40 decibels relative to reflectivity (dBZ).

10. The method of claim 1, wherein indicating each of the portions of the plurality of vertical columns as associated with the one or more lower reflectivity ranges comprises representing each of the portions in the highest reflectivity range as being associated with a second-highest reflectivity range from among the one or more lower reflectivity ranges.

11. The method of claim 10, wherein representing one of the portions in the second-highest reflectivity range comprises depicting the portion in a non-red color in a graphical weather radar display output, such that representing each of the portions in the highest reflectivity range as being associated with the second-highest reflectivity range comprises depicting each of the portions in the highest reflectivity range in the non-red color in the graphical weather radar display output.

12. A device comprising:
  a computer-readable medium having program code stored thereon; and
  one or more processors, the device configured for the program code to be executable by the one or more processors for causing the one or more processors to:
    determine, for each respective vertical column of the plurality of vertical columns from a weather radar signal, a reflectivity range selected from a highest reflectivity range and one or more lower reflectivity ranges;
    determine, for each respective vertical column of the plurality of vertical columns, in response to determining that any of the portions of the respective vertical columns are in the highest reflectivity range, whether a combination of the determined reflectivity ranges of the portions of the vertical column meet one or more criteria indicative of high-reflectivity stratiform weather; and
    generate, in response to determining that the combination of the determined reflectivity ranges of the portions of the vertical column meet the one or more criteria indicative of high-reflectivity stratiform weather for each of the vertical columns, a weather radar output that indicates each of the portions of all of the vertical columns as associated with one of the one or more lower reflectivity ranges.

13. The device of claim 12, the device being further configured for the program code to be executable by the one or more processors such that determining whether the combination of the determined reflectivity ranges of the portions of the plurality of vertical columns meet the one or more criteria indicative of high-reflectivity stratiform weather comprises determining whether a vertically integrated reflectivity (VIR) of at least one of the plurality of vertical columns is below a threshold VIR.

14. The device of claim 12, the device being further configured for the program code to be executable by the one or more processors such that determining whether the combination of the determined reflectivity ranges of the portions of the plurality of vertical columns meet the one or more criteria indicative of high-reflectivity stratiform weather comprises determining whether a vertical span of the portions of at least one of the plurality of vertical columns that are in the highest reflectivity range is less than a threshold vertical span.

15. The device of claim 12, the device being further configured for the program code to be executable by the one or more processors such that determining whether the combination of the determined reflectivity ranges of the portions of the plurality of vertical columns meet the one or more criteria indicative of high-reflectivity stratiform weather comprises determining whether a vertical difference in reflectivity range between at least one of the portions of at least one of the plurality of vertical columns that are in the highest reflectivity range and at least one of the portions of the at least one of the plurality of vertical columns that are in one of the lower reflectivity ranges is greater than a threshold difference.

16. A weather radar system comprising:
a radar transceiver; and
one or more processors configured to:
  determine, for each of a plurality of portions of a plurality of vertical columns from a weather radar signal received via the radar transceiver, a reflectivity range selected from a highest reflectivity range and one or more lower reflectivity ranges;
  determine, for each respective vertical column of the plurality of vertical columns, in response to determining that any of the portions of the respective vertical columns are in the highest reflectivity range, whether a combination of the determined reflectivity ranges of the portions of the vertical column meet one or more criteria indicative of high-reflectivity stratiform weather; and
  generate, in response to determining that the combination of the determined reflectivity ranges of the portions of the vertical columns meet the one or more criteria indicative of high-reflectivity stratiform weather for each of the vertical columns, a weather radar output that indicates each of the portions of all of the vertical columns as associated with one of the one or more lower reflectivity ranges.

17. The weather radar system of claim 16, wherein being configured to determine whether the combination of the determined reflectivity ranges of the portions of the plurality of vertical columns meet the one or more criteria indicative of high-reflectivity stratiform weather comprises being configured to determine whether a vertically integrated reflectivity (VIR) of at least one of the vertical columns is below a threshold VIR.

18. The weather radar system of claim 16, wherein being configured to determine whether the combination of the determined reflectivity ranges of the portions of the plurality of vertical columns meet the one or more criteria indicative of high-reflectivity stratiform weather comprises being configured to determine whether a vertical span of the portions of at least one of the vertical columns that are in the highest reflectivity range is less than a threshold vertical span.

19. The weather radar system of claim 16, wherein being configured to determine whether the combination of the determined reflectivity ranges of the portions of the plurality of vertical columns meet the one or more criteria indicative of high-reflectivity stratiform weather comprises being configured to determine whether a vertical difference in reflectivity range between at least one of the portions of at least one of the vertical columns that are in the highest reflectivity range and at least one of the portions of the at least one of the vertical columns that are in one of the lower reflectivity ranges is greater than a threshold difference.

* * * * *

UNITED STATES PATENT AND TRADEMARK OFFICE
CERTIFICATE OF CORRECTION

PATENT NO. : 9,547,082 B2
APPLICATION NO. : 14/534926
DATED : January 17, 2017
INVENTOR(S) : Paul E. Christianson and Brian P. Bunch It is certified that error appears in the above-identified patent and that said Letters Patent is hereby corrected as shown below:

In the Claims

Column 18, Claim 12, Line 51-52: Replace "determine, for each respective vertical column of the plurality of vertical coumns from a weather radar signal" with -- determine, for each of a plurality of portions of a plurality of vertical columns from a weather radar signal --

Signed and Sealed this
Second Day of January, 2018

Joseph Matal
*Performing the Functions and Duties of the
Under Secretary of Commerce for Intellectual Property and
Director of the United States Patent and Trademark Office*